(12) United States Patent
Marsico

(10) Patent No.: US 8,693,423 B2
(45) Date of Patent: Apr. 8, 2014

(54) METHODS, SYSTEMS, AND COMPUTER READABLE MEDIA FOR PROVIDING ENHANCED MOBILE SUBSCRIBER LOCATION REGISTER FAULT RECOVERY

(75) Inventor: Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 136 days.

(21) Appl. No.: 13/355,817

(22) Filed: Jan. 23, 2012

(65) Prior Publication Data

US 2012/0207015 A1   Aug. 16, 2012

Related U.S. Application Data

(60) Provisional application No. 61/443,570, filed on Feb. 16, 2011.

(51) Int. Cl.
*H04W 4/00*    (2009.01)

(52) U.S. Cl.
USPC .......... 370/329; 370/401; 455/433; 455/435.1

(58) Field of Classification Search
USPC .......... 370/216, 310, 328, 329, 340, 341, 392, 370/400, 401; 455/403, 422.1, 423, 424, 455/431.1, 431.2, 431.3, 433, 435.1, 435.2, 455/435.3
See application file for complete search history.

(56) References Cited

U.S. PATENT DOCUMENTS

| | | | |
|---|---|---|---|
| 6,611,685 B1 * | 8/2003 | Rune et al. | 455/433 |
| 6,788,936 B1 * | 9/2004 | Rune et al. | 455/433 |
| 7,039,402 B1 * | 5/2006 | Gan et al. | 455/433 |
| 7,366,945 B2 * | 4/2008 | Wang et al. | 714/4.11 |
| 8,224,337 B2 * | 7/2012 | Gosnell et al. | 455/445 |
| 2005/0081095 A1 * | 4/2005 | Wang et al. | 714/13 |
| 2007/0281686 A1 * | 12/2007 | Liu et al. | 455/433 |
| 2013/0128777 A1 * | 5/2013 | Garcia Azorero | 370/259 |

FOREIGN PATENT DOCUMENTS

WO    WO 2008/071229 A1    6/2008

OTHER PUBLICATIONS

Third Generation Partnership Project, "Technical Specification Group Core Network and Terminals; Evolved Packet System (EPS); Mobility Management Entity(MME) and Serving GPRS Support Node (SGSN) related interfaces based on Diameter protocol," 3GPP TS 29.272 v9.0.0 (Release 9) (Sep. 2009).

* cited by examiner

*Primary Examiner* — Kerri Rose
(74) *Attorney, Agent, or Firm* — Jenkins, Wilson, Taylor & Hunt, P.A.

(57) ABSTRACT

Methods, systems, and computer readable media for providing enhanced mobile subscriber location register fault recovery are disclosed. According to one method, the method occurs at a signaling message routing node. The method includes storing, in a memory, mobile subscriber location information. The method also includes receiving a reset related message associated with a mobile subscriber from a recovering mobile subscriber location register. The method further includes extracting, from the memory, mobile subscriber location information and responding to the recovering mobile subscriber location register with the mobile subscriber location information.

22 Claims, 4 Drawing Sheets

METHODS, SYSTEMS, AND COMPUTER READABLE MEDIA FOR PROVIDING ENHANCED MOBILE SUBSCRIBER LOCATION REGISTER FAULT RECOVERY

PRIORITY CLAIM

This application claims the benefit of U.S. Provisional Patent Application Ser. No. 61/443,570 filed Feb. 16, 2011; the disclosure of which is incorporated herein by reference in its entirety.

TECHNICAL FIELD

The subject matter described herein relates to communications networks. More specifically, the subject matter relates to methods, systems, and computer readable media for providing enhanced mobile subscriber location register fault recovery.

BACKGROUND

In various mobile communications networks, mobile subscriber location registers (e.g., home subscriber servers (HSSs), subscriber profile repositories (SPRs), and home location registers (HLRs)) are nodes that may store location information about mobile subscribers. For example, a 3rd Generation Partnership Project (3GPP) Long Term Evolution (LTE) network may include an HSS and/or an SPR for storing location information and/or other information about mobile subscribers. In another example, a global system for mobile communications (GSM) network or an IS-41 network may include an HLR for storing location information and/or other information about mobile subscribers.

Sometimes a mobile subscriber location register may experience problems. For example, a software or hardware malfunction in the register may cause the register to reboot, restart, or otherwise attempt to recover. Conventionally, when a mobile subscriber location register is attempting a recovery procedure, the recovering mobile subscriber location register may send a reset message to nodes serving mobile subscribers (e.g., mobility management entities (MMES) and/or mobile switching centers (MSCs)) in the home network. Upon receipt of the reset message, each serving node may notify the mobile subscriber location register as to which subscribers are currently being served by the responding node.

Problems can arise if relevant nodes are not contacted when the mobile subscriber location register is recovering. For example, a mobile subscriber location register may have no way of knowing which nodes residing outside of its home network are serving its subscribers, and consequently may not send reset messages to these foreign nodes. Without a reset message, a foreign node may not notify the mobile subscriber location register as to which subscribers are currently being served by the responding node, thereby preventing the mobile subscriber location register from reconstructing location information for roaming subscribers.

Accordingly, in light of these shortcomings, there exists a need for methods, systems, and computer readable media for providing enhanced mobile subscriber location register fault recovery.

SUMMARY

Methods, systems, and computer readable media for providing enhanced mobile subscriber location register fault recovery are disclosed. According to one method, the method occurs at a signaling message routing node. The method includes storing, in a memory, mobile subscriber location information. The method also includes receiving a reset related message associated with a mobile subscriber from a recovering mobile subscriber location register. The method further includes extracting, from the memory, mobile subscriber location information and responding to the recovering mobile subscriber location register with the mobile subscriber location information.

A system for providing enhanced mobile subscriber location register fault recovery is also disclosed. The system includes a signaling message routing node. The signaling message routing node includes a memory. The signaling message routing node also includes a fault recovery module configured to store, in the memory, mobile subscriber location information, to receive a reset related message associated with a mobile subscriber from a recovering mobile subscriber location register, to extract, from the memory, mobile subscriber location information, and to respond to the recovering mobile subscriber location register with the extracted mobile subscriber location information.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein discloses methods, systems, and computer readable media for providing enhanced mobile subscriber location register fault recovery. Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
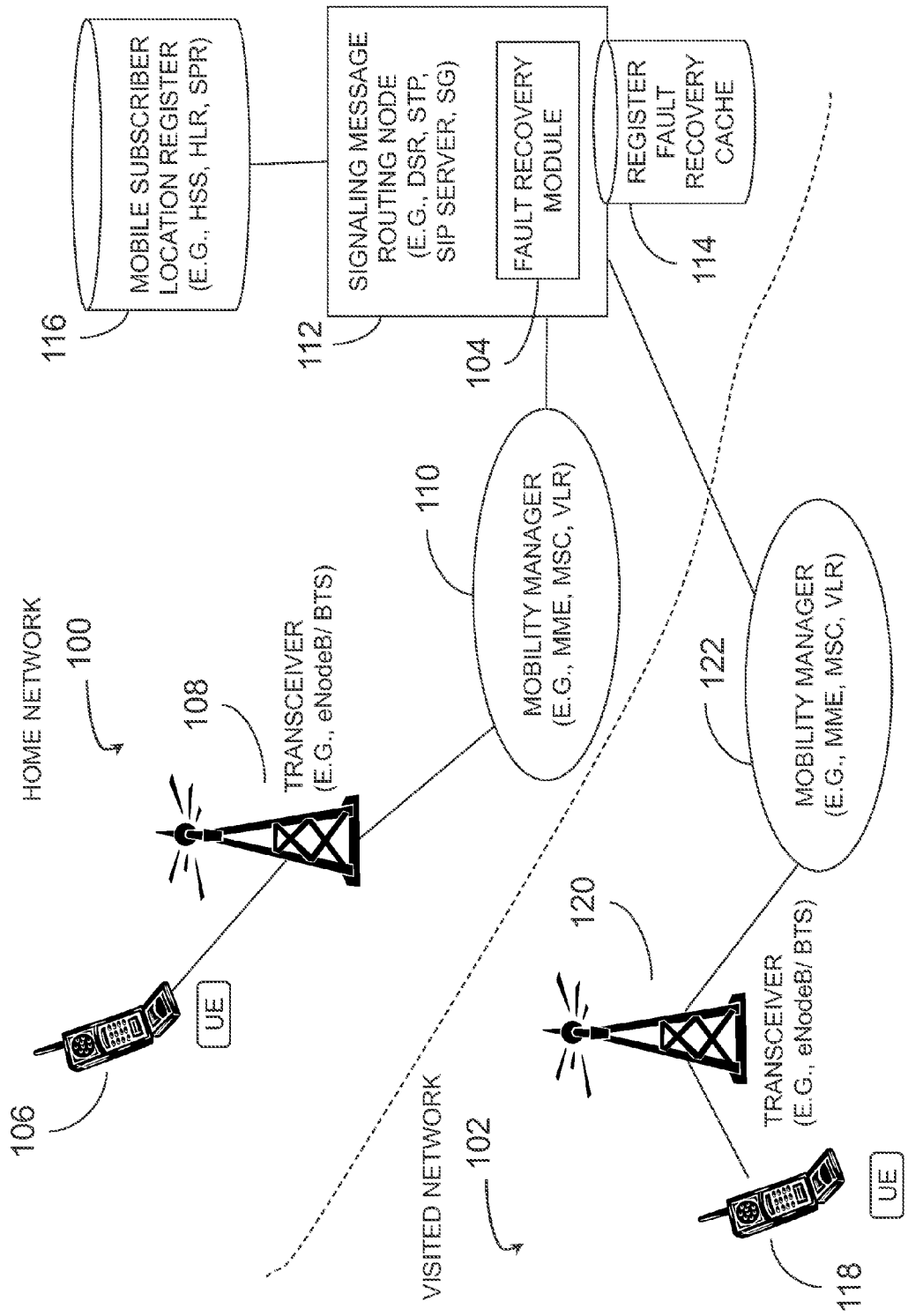
FIG. 1 is a diagram illustrating an exemplary environment for providing enhanced mobile subscriber location register fault recovery according to an embodiment of the subject matter described herein.

FIG. 1 is a diagram illustrating an exemplary environment for providing enhanced mobile subscriber location register fault recovery according to an embodiment of the subject matter described herein. Referring to FIG. 1, a home network 100 and a visited network 108 is depicted. Home network 100 may be associated with user equipment (UE) 112 and 118. For example, users of UE 112 and 118 may be mobile subscribers that are customers of a service provider that owns or control home network 100. Visited network 102 may be a network distinct from home network 100. Visited network 102 may be used by UEs 112 and 118 when roaming or traveling outside of the coverage area of home network 100. Home network 100 may include a transceiver node 108, a mobility manager 110, a signaling message routing node (SMRN) 112, and a mobile subscriber location register (MSLR) 116. Visited network 102 may include one or more similar nodes, e.g., a transceiver 120 and a mobility manager 122.

In some embodiments, home network 100 and/or visited network 108 may be long term evolution (LTE) networks. For example, in such embodiments, transceiver node 108 may be an evolved node B (eNode B). Mobility manager 110 may be a MME. SMRN 112 may be a Diameter signaling router (DSR) and MSLR 116 may be an HSS or an SPR.

In some embodiments, home network 100 and/or visited network 108 may be a GSM network, an IS-41 network, or other network types. For example, in such embodiments, transceiver node 108 may be a node B (Node B) or a base transceiver station (BTS). Mobility manager 110 may be an MSC or an MSLR (e.g., a visitor location register (VLR)). SMRN 112 may be a signal transfer point (STP), SIP server, or signaling gateway. MSLR 116 may be an HLR.

UE 106 (e.g., a mobile handset) may be connected to transceiver node 108, which may perform radio access functions. Transceiver node 108 may provide UE-related information (e.g., location- or mobility-related data) or UE-initiated messages to mobility manager 110. Mobility manager 110 may be any suitable entity for communicating with transceiver node 108 and for receiving location information about UEs. For example, mobility manager 110 may be an MSC, a location register, or an MME and may send and receive location update messages about UE 106. Mobility manager 110 may communicate subscriber information (e.g., mobility-related information) to other nodes in home network 100 or visited network 102. In some embodiments, mobility manager 110 may communicate with MSLR 116 via SMRN 112, other intermediate nodes, or directly.

SMRN 112 may be any suitable entity for routing signaling messages. For example, SMRN 112 may be configured to route, process, or handle signaling system 7 (SS7) messages, SIGTRAN signaling messages, Internet protocol (IP)-encapsulated SS7 messages, Diameter signaling messages, or session initiation protocol (SIP) messages. In some embodiments, SMRN 112 may be an LTE signaling router, an LTE DSR, a Diameter proxy, a Diameter routing agent, or a Diameter redirect agent, a SIP server, a SIP proxy, a signaling gateway, a SIGTRAN node, an IP-based routing node, or a signaling system 7 (SS7)-based routing node, such as an STP.

SMRN 112 may include a fault recovery module 104. Fault recovery module 104 may be any suitable entity (e.g., a field-programmable gateway array (FPGA), an application-specific integrated circuit (ASIC), or software executing on a processor) for providing or assisting with an enhanced fault recovery procedure. For example, SMRN 112 may observe and/or intercept various messages (e.g., Diameter signaling messages, IP messages, SIP messages, and/or SS7 messages) and store relevant mobile subscriber information, such as a subscriber identifier (ID), a serving node ID, and serving mobile subscriber location register ID. When MSLR 116 (e.g., an HSS) experiences a fault or problem, MSLR 116 may initiate a recovery procedure. During the recovery procedure, MSLR 116 may send recovery or reset related messages (e.g., Diameter Reset Request (RSR) or a mobile application part (MAP) RESET message) to one or more nodes (e.g., mobility manager 110) in home network 100. SMRN 112 may be involved in routing the reset related messages their destinations. In response to observing or receiving reset related messages, SMRN 112 and/or fault recovery module 104 may assist in performing an enhanced register fault recovery procedure.

In some embodiments, the enhanced register fault recovery procedure may include informing the location register of mobile subscriber information of which the recovering register may be unaware. For example, using observed or stored information, SMRN 112 and/or fault recovery module 104 may send one or more messages containing location and/or other relevant information about mobile subscribers (e.g., a Diameter Update Location requests) on behalf of one of more nodes in home network 100 and/or visited network 102. The messages may provide the register (e.g., MSLR 116) with location information of mobile subscribers who are roaming (e.g., in visited network 102) and may also include information identifying relevant serving nodes (e.g., mobility manager 122). In some embodiments, SMRN 112 and/or fault recovery module 104 may store relevant information in a register fault recovery cache 114.

Register fault recovery cache 114 may be any suitable entity (e.g., memory or another non-transitory computer readable medium) for storing or maintaining various data about mobile subscribers and/or usable during an enhanced fault recovery procedure. For example, cache 114 may be used to store subscriber IDs (e.g., international mobile subscriber identities (IMSIs)), various serving node data (e.g., an MSC ID, a VLR ID, or an MME ID), and home mobile subscriber location register data (e.g., an HSS ID, an SPR ID, or an HLR ID). Cache 114 may be queried by SMRN 112, fault recovery module 104, or another node or module. Using information obtained from cache 114, messages containing location and/or other relevant information about mobile subscribers may be generated and sent to one of more nodes in home network 100 and/or visited network 102. In some embodiments, cache functionality may be included in one or more modules (e.g., fault recovery module 104) that may be included in or accessible by SMRN 112.

In some embodiments, SMRN 112, or modules therein, may communicate with mobility manager 110, MSLR 116, and other nodes via one or more LTE signaling interfaces. For example, SMRN 112 may be a DSR and may exchange or communicate messages between mobility manager 110 (e.g., a MME) and MSLR 116 (e.g., an HSS) via one or more LTE S6 interfaces (e.g., LTE S6a/S6d interfaces). In a second example, SMRN 112 may exchange or communicate messages with MSLR 116 (e.g., an SPR) via one or more LTE Sp interfaces.

In some embodiments, SMRN 112, or modules therein, may communicate with nodes via one or more non-LTE signaling interfaces. For example, SMRN 112 may be a signaling gateway and may exchange or communicate messages between mobility manager 110 (e.g., a MSC) and MSLR 116 (e.g., an HSS) via one or more GSM interfaces (e.g., a GSM C interface). In another example, SMRN 112 may be a SIP server and may communicate with IP multimedia subsystem (IMS) nodes, such as call session control functions (CSCF), using IMS-related interfaces.

Home network 100 may include one or more MSLRs, such as an HSS, an HLR, or an SPR. MSLR 116 may be any suitable entity (e.g., a database or node) for storing location and other information about mobile subscribers. MSLR 116 may maintain subscriber-related information, such as user identification, control information for user authentication and authorization, location information, and user profile data.

In some embodiments, an MSLR 116 may also include AAA functionality. For example, MSLR 116 may perform authentication, authorization, and accounting functions associated with the subscriber. In another embodiment, AAA functionality may be performed by or performed at a node separate or independent from MSLR 116.

In some embodiments, MSLR 116 may maintain subscription related information, such as subscription profiles, policy information, and/or PCC rules. For example, an MSLR 116 may include a database, an HSS, an AAA, an SPR, or other node. MSLR 116 may store policy information for use for making policy decisions. In one embodiment, a subscription profile may include authorization information, charging information, subscription information (e.g., access or service tiers), and quality of service (QoS) information associated with a subscriber, session, device, and/or an SDF. For example, a subscription profile may include information on a subscriber's permitted services, service pre-emption priorities, allowed QoS, and charging related data information for different types of SDFs.

In some embodiments, MSLR 116 may communicate with SMRN 112, MME 110, and/or various other nodes via SMRN 112, other intermediate nodes, or directly.

Visited network 102 may include similar nodes to those described above. For example, roaming UE 118 may be connected to transceiver node 120, which performs radio access functions. Transceiver node 120 may provide UE-related information (e.g., location- or mobility-related data) or UE-initiated messages to mobility manager 122. Mobility manager 122 may communicate subscriber information (e.g., mobility-related information) to nodes in home network 100 or visited network 102.

In some embodiments, mobility manager 122 may communicate with MSLR 116 via SMRN 112, other intermediate nodes, or directly. For example, signaling messages (e.g., Update Location messages) may be sent from mobility manager 122 to MSLR 116 via an LTE S6 interface or another interface (e.g., a SIP interface). In another example, SMRN 112 may receive messages from mobility manager 122 via an LTE S6 interface and may send the messages to MSLR 116 via another S6 interface. In this example, SMRN 112 may send response messages from MSLR 116 to mobility manager 122.

It will be appreciated that FIG. 1 is for illustrative purposes and that various nodes, their locations, and/or their functions may be changed, altered, added, or removed. For example, some nodes and/or functions may be combined into a single entity, e.g., an SPR and an HSS may be included in MSLR 116. In a second example, a node and/or function may be located at or implemented by two or more nodes.

Figure 2:
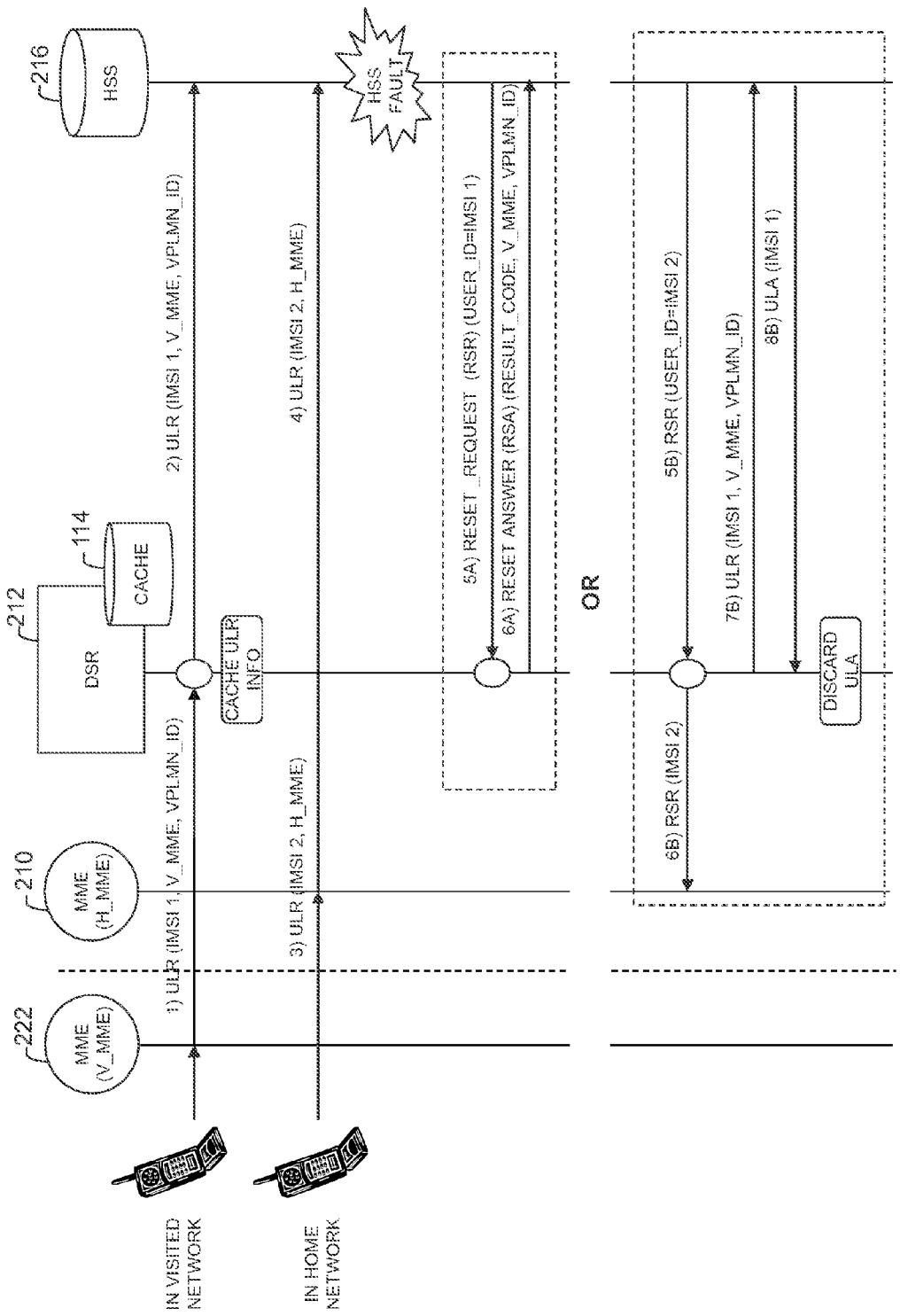
FIG. 2 is a message flow diagram illustrating exemplary messages associated with an enhanced fault recovery procedure according to an embodiment of the subject matter described herein.

FIG. 2 is a message flow diagram illustrating exemplary messages associated with an enhanced fault recovery procedure according to an embodiment of the subject matter described herein. In the embodiment illustrated in FIG. 2, exemplary LTE nodes are depicted and may provide similar functionality as described in FIG. 1 for corresponding nodes. For example, MME 222 may represent mobility manager 122 in visited network 102, MME 210 may represent mobility manager 110 in home network 100, DSR 212 may represent SMRN 112, and HSS 216 may represent MSLR 116.

In some embodiments, DSR 212 may include functionality for receiving or processing one or more Diameter signaling messages. DSR 212 may also include a fault recovery module 114 for performing one or more aspects associated with assisting in a register fault recovery. For example, DSR 212 may receive and process Diameter messages received via an LTE S6 interface or other LTE-related interfaces. DSR 212 may be configured to inspect received messages, obtain information related to mobile subscribers from the messages and/or other sources, and store the information (e.g., in cache 114). DSR 212 may be configured to use the stored information for assisting in a register fault recovery procedure.

For example, in step 1, a Diameter update location request (ULR) message associated with a roaming mobile subscriber (e.g., identified by IMSI 1) may be sent from MME 222 towards HSS 216. The ULR message may include mobile subscriber information, such as an IMSI for identifying the roaming mobile subscriber or associated UE, an ID for identifying MME 222, and a public land mobile network (PLMN) ID for identifying visited network 102.

In some embodiments, DSR 212 may observe, intercept, or receive an ULR message associated with a roaming mobile subscriber. DSR 212 may inspect the ULR message for relevant mobile subscriber information. DSR 212 may store or cache relevant mobile subscriber information. For example, DSR 212 may store an IMSI, an MME ID, and a PLMN ID in register fault recovery cache 114.

In step 2, the ULR message may be sent from DSR 212 to HSS 216. HSS 216 may receive the ULR message and may update information about the relevant mobile subscriber based on information in the ULR message.

In step 3, a ULR message associated with a local or non-roaming mobile subscriber (e.g., identified by IMSI 2) may be sent from MME 222 towards HSS 216. The ULR message may include mobile subscriber information, such as an IMSI for identifying the local mobile subscriber or associated UE and an ID for identifying MME 210.

In some embodiments, DSR 212 may not observe and store subscriber information associated with a local mobile subscriber.

In some embodiments, DSR 212 may observe, intercept, or receive an ULR message associated with a local mobile subscriber. DSR 212 may inspect the ULR message for relevant mobile subscriber information. DSR 212 may store or cache relevant mobile subscriber information. For example, DSR 212 may store an IMSI and an MME ID in register fault recovery cache 114.

In step 4, the ULR message may be sent from DSR 212 to HSS 216. HSS 216 may receive the ULR message and may update information about the relevant mobile subscriber based on information in the ULR message.

At some point in time, HSS 216 may experience a fault or problem. For example, a memory or processor failure may occur and a standby node or component may come online. In another example, HSS 216 may attempt a reboot or reset to recover from its problems. In response to experiencing a fault, HSS 216 or a backup node may initiate a fault recovery procedure. In some embodiments, a fault recovery procedure may include sending recovery or reset related messages to relevant nodes in its home network, such as MME 210.

In some embodiments, a fault recovery procedure may include sending recovery or reset related messages to DSR 212 or a module therein. In such embodiments, DSR 212 or a module therein (e.g., fault recovery module 104) may assist in a register fault recovery procedure by providing HSS 216 with subscriber information associated with roaming mobile subscribers. For example, DSR 212 may generate reset answer (RSA) messages on behalf of foreign nodes serving roaming subscribers (e.g., MME 222) and may send the RSA messages to the serving home location register (e.g., HSS 216) associated with each roaming subscriber. Steps 5A-6A describe such steps in further detail below.

In step 5A, after an HSS fault and during a recovery procedure, a Diameter reset request (RSR) message associated with a roaming mobile subscriber may be sent from HSS 216 to DSR 212. DSR 212 may determine, using information stored in cache 114, relevant information about the roaming mobile subscriber and may generate a response or answer message containing the relevant information on behalf of the foreign node (e.g., MME 222) serving the roaming mobile subscriber.

In step 6A, an RSA message that includes relevant information about the roaming subscriber may be sent from DSR 212 to HSS 216. HSS 216 may receive the RSA message and may update information about the roaming mobile subscriber based on information in the RSA message.

In some embodiments, a fault recovery procedure may include sending recovery or reset related messages to appropriate home networks nodes (e.g., MME 210). In such embodiments, DSR 212 may observe and/or receive the reset related messages and assist in routing or sending the reset related messages to their intended destinations. In response to observing, receiving, or processing reset related messages destined to home network nodes, DSR 212 may be configured to assist in a register fault recovery procedure by providing HSS 216 with subscriber information associated with roaming mobile subscribers. For example, DSR 212 may generate ULR and/or other messages on behalf of foreign nodes (e.g., MME 222) serving roaming subscribers and may send the ULR messages to the home register (e.g., HSS 216) associated with each roaming subscriber. Steps 5B-8B describe such steps in further detail below.

In step 5B, after an HSS fault and during a recovery procedure, a Diameter reset request (RSR) message associated with a local or non-roaming mobile subscriber may be sent from HSS 216 to DSR 212.

In step 6B, the RSR message may be sent from DSR 212 to MME 210. Additionally actions (not shown) associated with the RSR message may be performed. For example, a RSA message containing location information and/or other information about the local mobile subscriber may be sent from MME 210 to HSS 216 via DSR 212.

DSR 212 may determine, using information stored in cache 114, location information about roaming mobile subscribers (e.g., UEs being served by MME 222) and may generate one or more messages (e.g., ULR messages) containing location information about the mobile subscribers on behalf of the foreign node (e.g., MME 222) serving the roaming mobile subscribers.

In step 7B, an ULR message that includes location information about the roaming subscriber may be sent from DSR 212 to HSS 216. HSS 216 may receive the ULR message and may update information about the relevant mobile subscriber based on information in the RSA message.

In some embodiments, DSR 212 may throttle messages containing location information sent to a recovering HSS 216. For example, DSR 212 may send messages (e.g., RSA messages, ULR messages, etc.) in such a way that HSS 216 does not become overloaded. In another example, DSR 212 may not start sending messages associated with foreign nodes until at least some messages from home network nodes have been sent to HSS 216.

In step 8B, after receiving a ULR message, an answer message (e.g., a Diameter update location answer (ULA) message or an Insert Subscriber Data (ISD) message) may be sent from HSS 216 destined for the foreign node (e.g., MME 222). For example, the answer message may be for indicating or acknowledging the message believed to be sent from the foreign node.

In some embodiments, DSR 212 may receive, intercept, or other obtain the answer message. DSR 212 may log and/or discard the answer message. For example, DSR 212 may prevent the answer message from reaching a foreign node so that the foreign node is unaware that one or more messages were communicated to HSS 216 on its behalf.

It will be appreciated that the above described message sequence is for illustrative purposes. In some embodiments, a message sequence may include additional and/or different messages.

Figure 3:
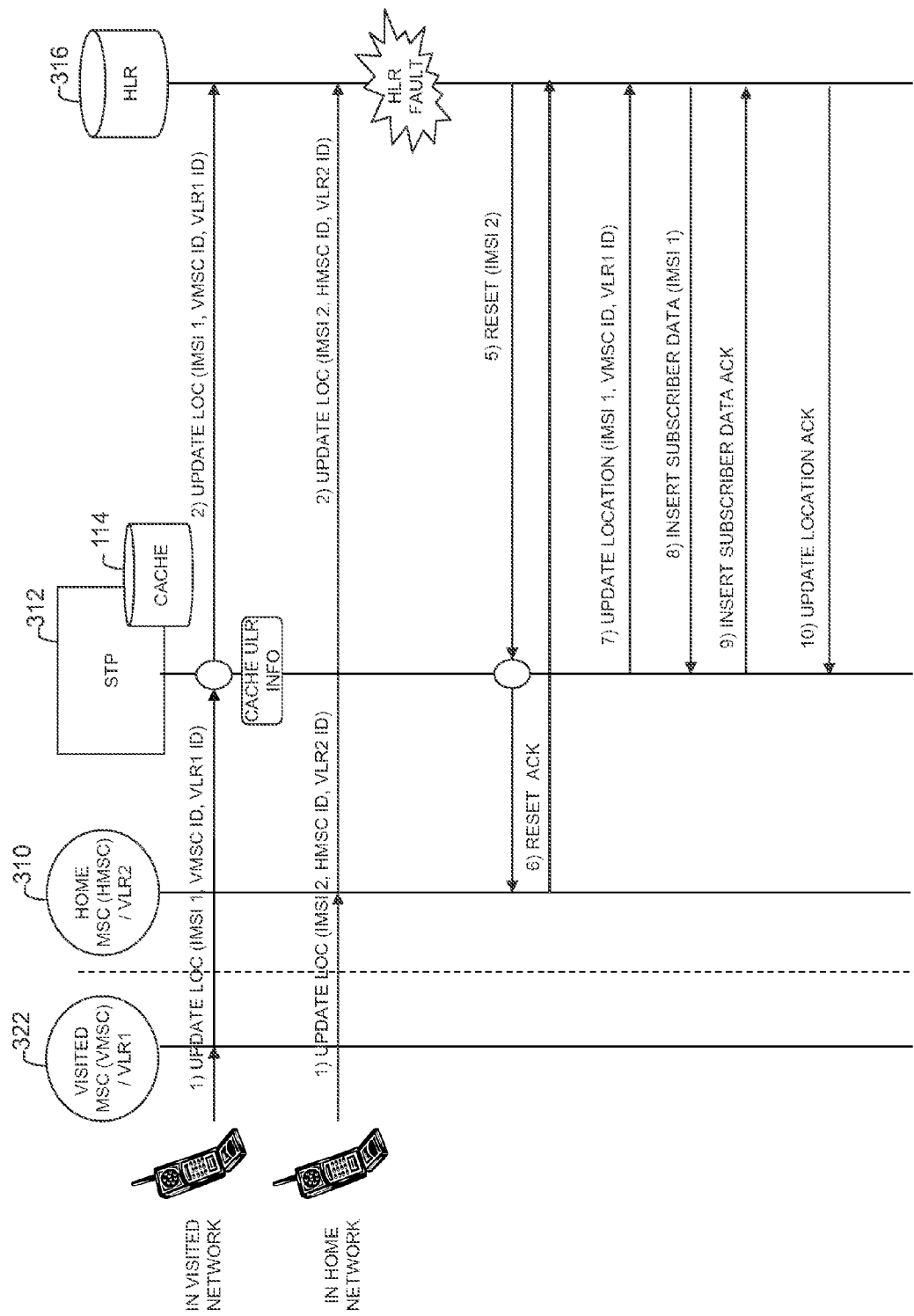
FIG. 3 is a message flow diagram illustrating exemplary messages associated with an enhanced fault recovery procedure according to another embodiment of the subject matter described herein.

FIG. 3 is a message flow diagram illustrating exemplary messages associated with an enhanced fault recovery procedure according to another embodiment of the subject matter described herein. In the embodiment illustrated in FIG. 3, exemplary GSM nodes are depicted and may provide similar functionality as described in FIG. 1 for corresponding nodes. For example, MSC or VLR (MSC/VLR) 322 may represent mobility manager 122 in visited network 102, (MSC/VLR) 310 may represent a home mobility manager 110 in home network 100, STP 312 may represent SMRN 112, and HLR 316 may represent MSLR 116.

In some embodiments, STP 312 may include functionality for receiving or processing one or more SS7, SIP, IP or other signaling messages. STP 312 may also include fault recovery module 114 for performing one or more aspects associated with assisting in a register fault recovery. For example, STP 312 may receive and process messages received via a GSM interface, a SIP interface, a simple object access protocol (SOAP) interface, an extensible markup language (XML) protocol, an IP interface, or other interfaces. STP 312 may be configured to inspect received messages, obtain information related to mobile subscribers from the messages and/or other sources, and store the information (e.g., in cache 114). STP 312 may be configured to use the stored information for assisting in a register fault recovery procedure.

For example, in step 1, a MAP update location (MUL) message associated with a roaming mobile subscriber (e.g., identified by IMSI 1) may be sent from MSC/VLR 322 towards HLR 316. The MUL message may include mobile subscriber information, such as an IMSI for identifying the roaming mobile subscriber or associated UE, an ID for identifying MSC/VLR 322, and a public land mobile network (PLMN) ID for identifying visited network 102.

In some embodiments, STP 312 may observe, intercept, or receive an MUL message associated with a roaming mobile subscriber. STP 312 may inspect the MUL message for relevant mobile subscriber information. STP 312 may store or cache relevant mobile subscriber information. For example, STP 312 may store an IMSI, an MSC/VLR ID, and a PLMN ID in register fault recovery cache 114.

In step 2, the MUL message may be sent from STP 312 to HLR 316. HLR 316 may receive the MUL message and may update information about the relevant mobile subscriber based on information in the MUL message.

In step 3, a MUL message associated with a local or non-roaming mobile subscriber (e.g., identified by IMSI 2) may be sent from MSC/VLR 322 towards HLR 316. The MUL message may include mobile subscriber information, such as an IMSI for identifying the local mobile subscriber or associated UE and an ID for identifying MSC/VLR 310.

In some embodiments, STP 312 may not observe and store subscriber information associated with a local mobile subscriber.

In some embodiments, STP 312 may observe, intercept, or receive an MUL message associated with a local mobile subscriber. STP 312 may inspect the MUL message for relevant mobile subscriber information. STP 312 may store or cache relevant mobile subscriber information. For example, STP 312 may store an IMSI and an MSC/VLR ID in register fault recovery cache 114.

In step 4, the MUL message may be sent from STP 312 to HLR 316. HLR 316 may receive the MUL message and may update information about the relevant mobile subscriber based on information in the MUL message.

At some point in time, HLR 316 may experience a fault or problem. For example, a memory or processor failure may occur and a standby node or component may come online. In another example, HLR 316 may attempt a reboot or reset to recover from its problems. In response to experiencing a fault, HLR 316 or a backup node may initiate a fault recovery procedure. In some embodiments, a fault recovery procedure may include sending recovery or reset related messages to relevant nodes in its home network, such as MSC/VLR 310.

In step 5, after an HLR fault and during a recovery procedure, a MAP reset (MRS) message associated with a local or non-roaming mobile subscriber may be sent from HLR 316 to STP 312.

In some embodiments, STP 312 or a module therein (e.g., fault recovery module 104) may observe, intercept, or receive an MRS message associated with a local mobile subscriber. STP 312 or a module therein may inspect the MRS message for relevant mobile subscriber information. STP 312 or a module therein may store or cache relevant mobile subscriber information. After processing, the MRS message may be sent from STP 312 to MSC/VLR 310.

In step 6, a MAP Reset acknowledgement (MACK) message containing location information and/or other information about the local mobile subscriber may be sent from MSC/VLR 310 to HLR 316 (e.g., via STP 312).

In some embodiments, STP 312 or a module therein (e.g., fault recovery module 104) may intercept MRS messages destined to home nodes and may generate MACK, MUL, and/or other messages on behalf of one or more nodes (e.g., MME 310 and MME 322). For example, STP 312 may receive a MRS message destined for MME 310 in home network 100 and, in response, may generate and send a MACK and/or MUL message on behalf of MME 310. In another example, STP 312 may receive a MRS message destined for MME 310 in home network 100 and, in response, may determine, using subscriber information stored in cache 114, whether any mobile subscribers associated with home network 100 are currently roaming. If one or more mobile subscribers associated with home network 100 are currently roaming, STP 312 may generate and send MACK and/or MUL messages on behalf of MME 322 or other foreign nodes.

STP 312 or a module therein may determine, using information stored in cache 114, location information about roaming mobile subscribers (e.g., UEs being served by MSC/VLR 322) and may generate one or more messages (e.g., MUL messages) containing relevant information about the mobile subscribers on behalf of the foreign node (e.g., MSC/VLR 322) serving the roaming mobile subscribers.

In step 7, an MUL message that includes location information about the roaming subscriber may be sent from DSR 212 to HSS 216. HSS 216 may receive the MUL message and may update information about the roaming mobile subscriber based on information in the MUL message.

In step 8, after receiving a MUL message, an answer message (e.g., a MAP insert subscriber data (MISD) message) may be sent from HLR 316 destined for the foreign node (e.g., MSC/VLR 322). For example, the answer message may be for indicating or acknowledging the message believed to be sent from the foreign node.

STP 312 may receive, intercept, or other obtain the answer message. In some embodiments, STP 312 may log and/or discard the answer message. For example, STP 312 may prevent the answer message from reaching a foreign node so that the foreign node is unaware that one or more messages were communicated to HLR 316 on its behalf.

In some other embodiments, STP 312 may respond to the answer message on behalf of the intended node. For example, STP 312 may send an acknowledgement message (e.g., a MAP insert subscriber data acknowledgement (MISDA) message) to HLR 316 on behalf of a foreign node.

In step 9, a MISDA message may be sent from STP 312 to HLR 316 on behalf of MSC/VLR 322.

In step 10, after receiving a MISDA message, an answer message (e.g., a MAP update location acknowledgement (MULA) message) may be sent from HLR 316 destined for the foreign node (e.g., MSC/VLR 322). For example, the answer message may be for indicating or acknowledging the message believed to be sent from the foreign node.

In some embodiments, STP 312 may receive, intercept, or other obtain the MULA message. In some embodiments, STP 312 may log and/or discard the MULA message.

In some embodiments, STP 312 may throttle messages containing location information sent to a recovering HLR 316. For example, STP 312 may send messages (e.g., MACK messages, MUL messages, MISDA messages, etc.) in such a way that HLR 316 does not become overloaded. In another example, STP 312 may not start sending messages associated with foreign nodes until at least some messages from home network nodes have been sent to HLR 316.

It will be appreciated that the above described message sequence is for illustrative purposes. In some embodiments, a message sequence may include additional and/or different messages.

Figure 4:
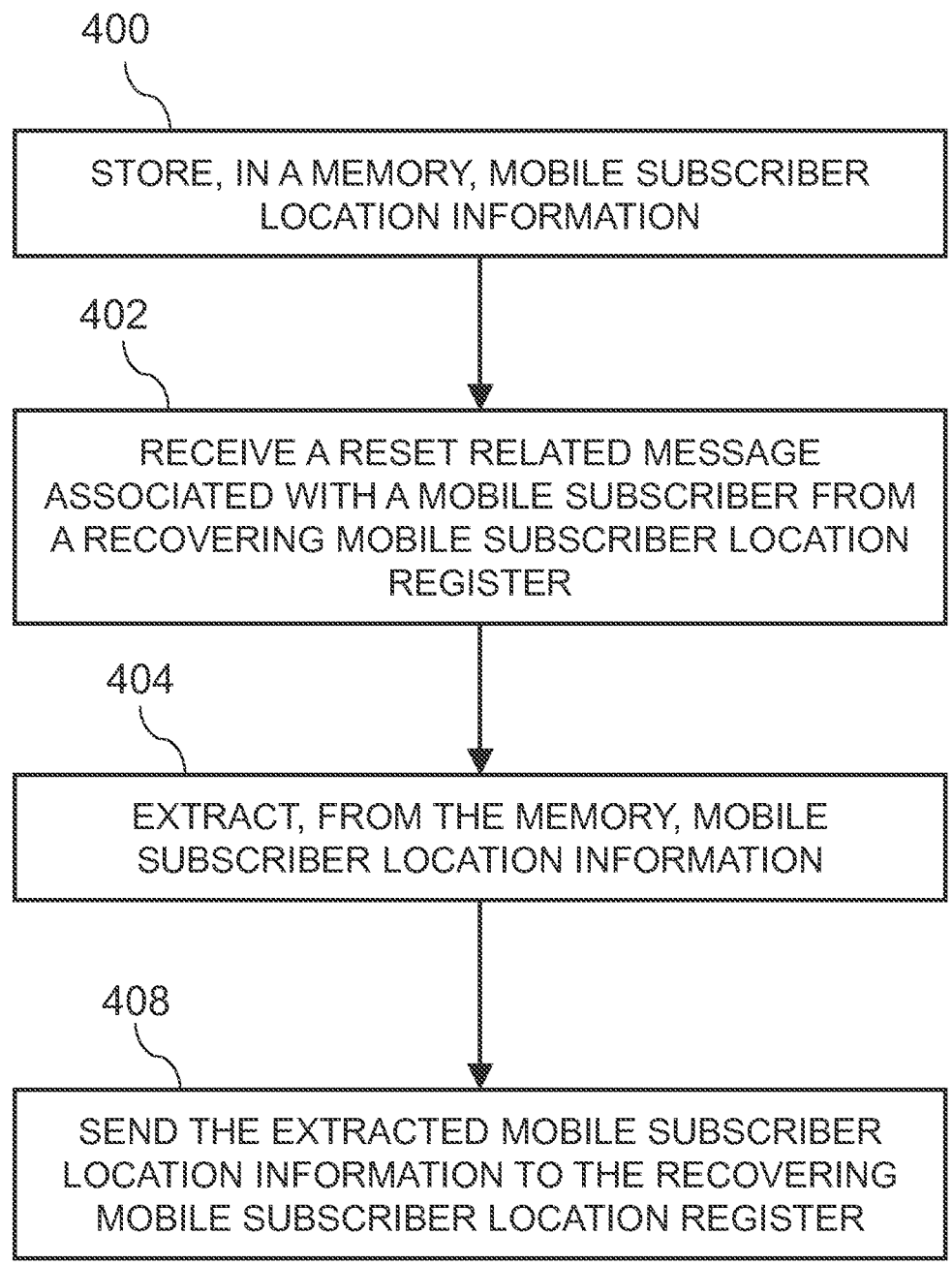
FIG. 4 is a flow chart illustrating exemplary steps for providing enhanced mobile subscriber location register fault recovery according to an embodiment of the subject matter described herein.

FIG. 4 is a flow chart illustrating exemplary steps for providing enhanced mobile subscriber location register fault recovery according to an embodiment of the subject matter described herein. In some embodiments, the exemplary process described herein, or portions thereof, may be performed by SMRN 112, fault recovery module 104, cache 114, DSR 212, STP 312, and/or other module(s).

In step 400, mobile subscriber location information may be stored in a memory. For example, SMRN 112, or one or modules therein (e.g., fault recovery module 104), may be configured to store IMSIs and serving node IDs associated with various mobile subscribers in cache 114. The information may be gathered or obtained from one or messages observed by SMRN 112 or fault recovery module 104.

In some embodiments, mobile subscriber location information may be derived from an SS7 message, an SIGTRAN signaling message, an IP-encapsulated SS7 message, a Diameter signaling message, a SIP message, a MUL message or a ULR message.

In some embodiments, mobile subscriber location information may include an MSC ID, a VLR ID, an MME ID, a visited PLMN ID, a mobile country code (MCC) ID, or a mobile network code (MNC) ID.

In step 402, a reset related message associated with a mobile subscriber may be received from a recovering mobile subscriber location register (e.g., MSLR 116, HSS 216, or HLR 316). For example, a Diameter reset request (RSR) message or a mobile application part (MAP) reset message may be received by SMRN 112 for routing to home network nodes.

In step 404, mobile subscriber location information may be extracted from the memory. For example, in response to receiving a reset related message, SMRN 112 or fault recovery module 104 may be configured to extract from cache 114 location information associated with a mobile subscriber identified in a reset related message.

In some embodiments, extracting the mobile subscriber location information may include extracting mobile subscriber location information associated with one or more mobile subscribers or serving nodes. For example, information may be extracted that is associated with mobile subscribers (e.g., roaming mobile subscribers) or serving nodes (e.g., foreign nodes) not identified in the reset related message.

In step 706, the extracted mobile subscriber location information may be sent to the recovering mobile subscriber location register.

In some embodiments, sending the extracted mobile subscriber location information to the recovering mobile subscriber location register may include generating, on behalf of a serving node, at least one of a reset response message (e.g., a MACK message, a RSA message, or ULR message) and a message containing the extracted mobile subscriber location information and sending the at least one message to the recovering mobile subscriber location register.

In some embodiments, the serving node may include a home mobile switching center (MSC), a foreign MSC, a home mobility management entity (MME), a foreign MME, a home node, or a foreign node.

In some embodiments, sending the extracted mobile subscriber location information to the recovering mobile subscriber location register may include intercepting and discarding an answer message from the recovering mobile subscriber location register. For example, a ULA message from HSS 216 that is address to a foreign node (e.g., MME 222) may be logged in cache 114 and discarded.

In some embodiments, sending the extracted mobile subscriber location information to the recovering mobile subscriber location register may include throttling the message so as not to overload the recovering mobile subscriber location register. For example, SMRN 112 or fault recovery module 104 may be configured to throttle reset response messages so that the messages are able to be processed without requiring re-transmissions or network congestion.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing enhanced mobile subscriber location register fault recovery, the method comprising:
at a signaling message routing node:
storing, in a memory, mobile subscriber location information;
receiving a reset related message associated with a mobile subscriber from a recovering mobile subscriber location register;
extracting, from the memory, mobile subscriber location information; and
sending the extracted mobile subscriber location information to the recovering mobile subscriber location register, wherein sending the extracted mobile subscriber location information to the recovering mobile subscriber location register includes generating, on behalf of a serving node, at least one of a reset response message and a message containing the extracted mobile subscriber location information and sending the at least one message to the recovering mobile subscriber location register; wherein sending the extracted mobile subscriber location information to the recovering mobile subscriber location register includes intercepting and discarding an answer message from the recovering mobile subscriber location register.

2. The method of claim 1 wherein the mobile subscriber location information is derived from a signaling system 7 (SS7) message, an SIGTRAN signaling message, an IP-encapsulated SS7 message, a Diameter signaling message, a session initiation protocol (SIP) message, a mobile application part (MAP) update location message or a Diameter update location request (ULR) message.

3. The method of claim 1 wherein the mobile subscriber location information includes a mobile switching center (MSC) identifier, a visitor location register (VLR) identifier, a mobility management entity (MME) identifier, a visited public land mobile network (PLMN) identifier, a mobile country code (MCC) identifier, or a mobile network code (MNC) identifier.

4. The method of claim 1 wherein the mobile subscriber location register includes a home subscriber server (HSS), a home location register (HLR), or a subscriber profile repository (SPR).

5. The method of claim 1 wherein the reset related message includes a Diameter reset request (RSR) message or a mobile application part (MAP) reset message.

6. The method of claim 1 wherein extracting mobile subscriber location information may include extracting mobile subscriber location information associated with one or more mobile subscribers or serving nodes.

7. The method of claim 1 wherein the serving node includes a home mobile switching center (MSC), a foreign MSC, a home mobility management entity (MME), a foreign MME, a home node, or a foreign node.

8. The method of claim 1 wherein sending the extracted mobile subscriber location information to the recovering mobile subscriber location register includes throttling the message so as not to overload the recovering mobile subscriber location register.

9. The method of claim 1 wherein the signaling message routing node comprises a Diameter signaling router (DSR).

10. The method of claim 1 wherein the signaling message routing node comprises a signal transfer point (STP).

11. A system for providing enhanced mobile subscriber location register fault recovery, the system comprising:
a signaling message routing node including:
a memory; and
a fault recovery module configured to store, in the memory, mobile subscriber location information, to receive a reset related message associated with a mobile subscriber from a recovering mobile subscriber location register, to extract, from the memory, mobile subscriber location information, and to send the extracted mobile subscriber location information to the recovering mobile subscriber location register, wherein the fault recovery module is configured to send the extracted mobile subscriber location information to the recovering mobile subscriber location register by generating, on behalf of a serving node, at least one of a reset response message and a message containing the extracted mobile subscriber location information, wherein the fault recovery module is configured to intercept and discard an answer message from the recovering mobile subscriber location register.

12. The system of claim 11 wherein the signaling message routing node is configured to receive signaling system 7 (SS7) messages, SIGTRAN signaling messages, IP-encapsulated SS7 messages, DIAMETER signaling messages, or session initiation protocol (SIP) messages.

13. The system of claim 11 wherein the fault recovery module is configured to store mobile subscriber location information derived from a signaling system 7 (SS7) mobile application part (MAP) update location message or a Diameter update location request (ULR) message.

14. The system of claim 11 wherein the fault recovery module is configured to store a mobile switching center (MSC) identifier, a visitor location register (VLR) identifier, a mobility management entity (MME) identifier, a visited public land mobile network (PLMN) identifier, a mobile country code (MCC) identifier, or a mobile network code (MNC) identifier.

15. The system of claim 11 wherein the mobile subscriber location register includes a home subscriber server (HSS), a home location register (HLR), or a subscriber profile repository (SPR).

16. The system of claim 11 wherein the reset related message includes a Diameter reset request (RSR) message or a mobile application part (MAP) reset message.

17. The system of claim 11 wherein the fault recovery module is configured to extract mobile subscriber location information associated with one or more mobile subscribers or serving nodes.

18. The system of claim 11 wherein the serving node includes a home mobile switching center (MSC), a foreign MSC, a home mobility management entity (MME), a foreign MME, a home node, or a foreign node.

19. The system of claim 11 wherein the fault recovery module is configured to throttle messages sent to the recovering mobile subscriber location register so as not to overload the recovering mobile subscriber location register.

20. The system of claim 11 wherein the signaling message routing node comprises a Diameter signaling router (DSR).

21. The system of claim 11 wherein the signaling message routing node comprises a signal transfer point (STP).

22. A non-transitory computer readable medium having stored thereon executable instructions that when executed by a processor of a computer control the computer to perform steps comprising:
at a signaling message routing node:
storing, in a memory, mobile subscriber location information;
receiving a reset related message associated with a mobile subscriber from a recovering mobile subscriber location register;
extracting, from the memory, mobile subscriber location information; and
sending the extracted mobile subscriber location information to the recovering mobile subscriber location register, wherein sending the extracted mobile subscriber location information to the recovering mobile subscriber location register includes generating, on behalf of a serving node, at least one of a reset response message and a message containing the extracted mobile subscriber location information and sending the at least one message to the recovering mobile subscriber location register; wherein sending the extracted mobile subscriber location information to the recovering mobile subscriber location register includes intercepting and discarding an answer message from the recovering mobile subscriber location register.

* * * * *